Patented Feb. 14, 1950

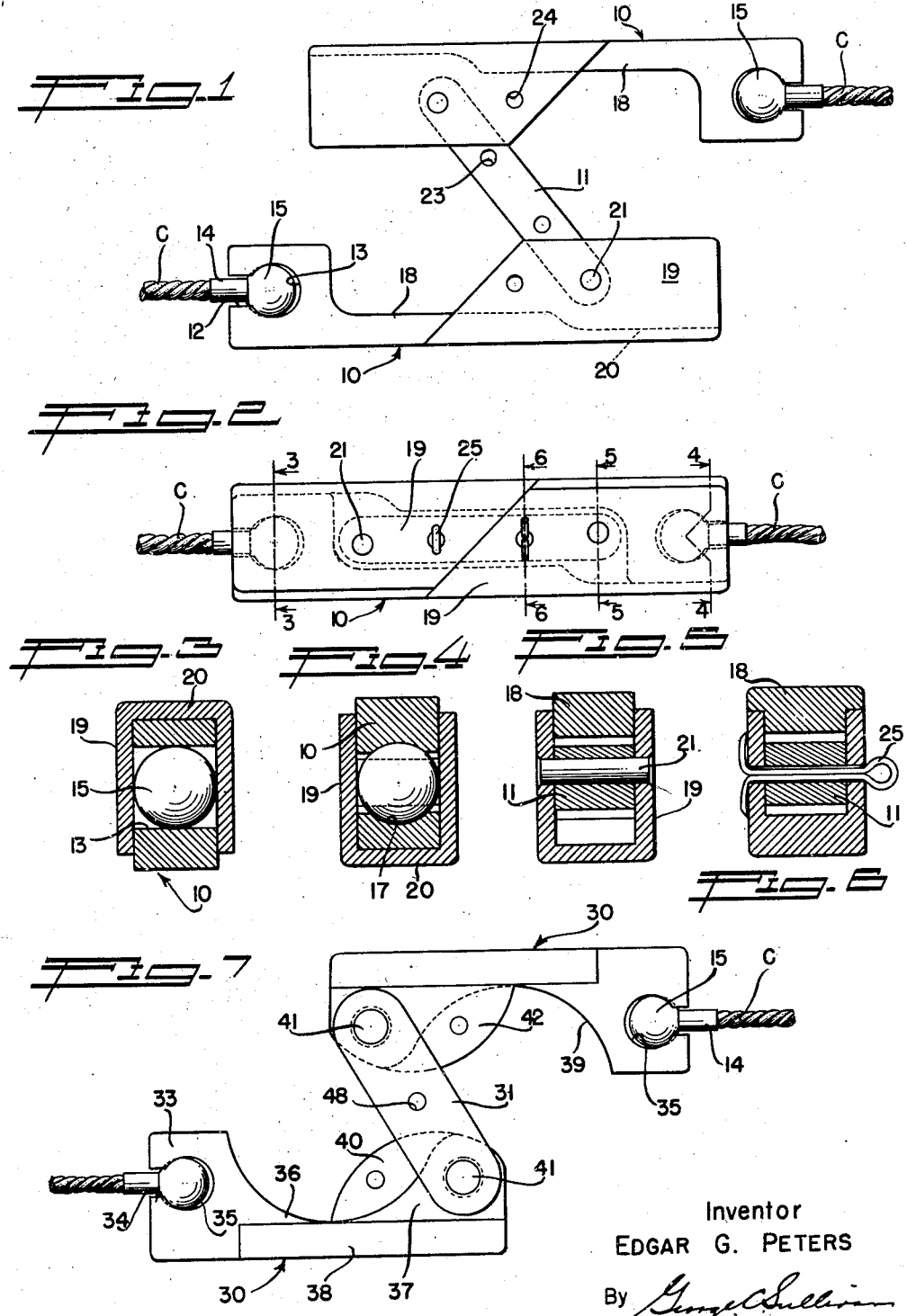
Feb. 14, 1950 — E. G. PETERS — 2,497,467
QUICK DISCONNECT COUPLING FOR CABLES
Filed March 3, 1947 — 2 Sheets-Sheet 1
Inventor
EDGAR G. PETERS
By George C. Sullivan
Agent

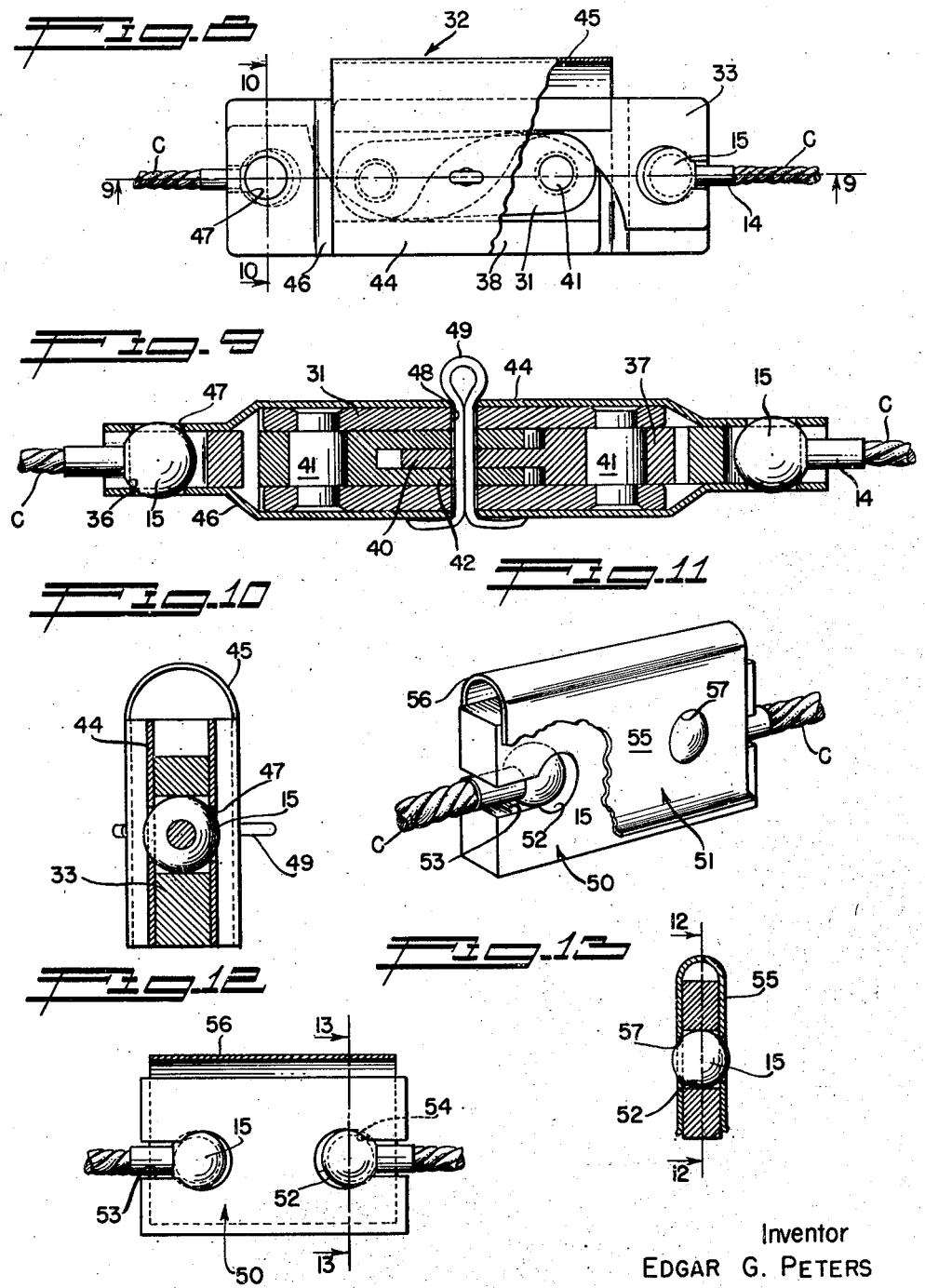

2,497,467

UNITED STATES PATENT OFFICE 2,497,467

QUICK DISCONNECT COUPLING FOR CABLES

Edgar G. Peters, Burbank, Calif., assignor to Lockheed Aircraft Corporation, Burbank, Calif.

Application March 3, 1947, Serial No. 732,072

9 Claims. (Cl. 24—68)

This invention relates to quickly detachable connectors for connecting flexible elements such as cables, wire ropes, wires, rods, etc. It is a general object of this invention to provide a simple, practical and dependable connector of this character.

In various situations where cables are employed, it is desirable to employ means for quickly disconnecting sections of the cables. For example, in the control systems of aircraft there are many instances where "quick disconnects" are required. It is, of course, important that the connectors be strong and reliable in service and resist accidental or unintentional release.

It is an object of this invention to provide a connector for cables and the like that is strong and positive when in service and yet may be easily and quickly released to allow disconnection of the cables.

It is another object of the invention to provide a connector for connecting the ends of cables or the like equipped with ball end fittings which connector is characterized by improved means for retaining the ball fittings in the seated position in recesses in the connector, this means being easily released intentionally to allow detachment of the cable. In certain forms of the invention the means for retaining the ball fittings in their recesses latches directly with the balls themselves while in other embodiments the ball retaining parts are formed on the body of the connector to prevent displacement of the balls from their recesses.

It is a further object of the invention to provide a quick disconnect coupling of the character referred to which automatically provides slack in the cable to facilitate easy disengagement of the ball fittings from their seats when the coupling is released and which automatically tensions the cable to insure proper engagement of the balls in their recesses and to restore proper tension in the cable when the connector is again conditioned for use. In addition to tensioning the cable and seating the balls, the device positively locks or retains the balls in their seats when restored to its service condition.

Other objects and advantages of the invention will become apparent from the following detailed description of typical embodiments, through which description reference will be made to the accompanying drawings in which:

Figure 1 is a side elevation of one connector of the invention in the open or released condition;

Figure 2 is a side view of the connector illustrated in Figure 1 showing it in the operative or service condition;

Figures 3, 4, 5 and 6 are enlarged transverse detailed sectional views taken as indicated by lines 3—3, 4—4, 5—5 and 6—6 respectively on Figure 2;

Figure 7 is a view similar to Figure 1 showing another form of the invention;

Figure 8 is a side elevation of the connector illustrated in Figure 7 in the operative or service condition with a portion of the clip broken away to appear in longitudinal cross-section;

Figure 9 is an enlarged longitudinal detailed sectional view taken as indicated by line 9—9 on Figure 8;

Figure 10 is an enlarged transverse sectional view taken as indicated by line 10—10 on Figure 8;

Figure 11 is a perspective view of still another form of the invention with a portion of the clip broken away;

Figure 12 is a side elevation of the connector illustrated in Figure 11 with the clip appearing in longitudinal cross-section; and Figure 13 is a transverse sectional view taken as indicated by line 13—13 on Figure 12.

Figures 1 to 6 inclusive illustrate an embodiment of the invention which automatically tensions the cables when operated to its service condition and which produces slack in the cables when operated to its released condition. This form of the invention includes two complementary body sections 10 and a link 11 connecting the two sections. The body sections 10 are elongate parts of suitable cross-section formed at their outer ends for the reception of the cable end fittings. The sections 10 may be alike or identical and as illustrated may be rectangular in transverse cross-section. The outer end portions of the sections 10 are block-like in shape and have transverse slots 12 which join transverse openings 13. The ends of the cables C have swedged-on fittings 14 terminating in substantially spherical balls 15. The slots 12 are proportioned to freely receive the fittings 14 and the openings 13 are adapted to receive the balls 15. From an inspection of Figure 1 it will be readily understood how the fittings may be passed laterally into the slots 12 to engage the balls 15 in the openings 13.

In accordance with the invention the walls of the openings 13 are spherically undercut or made spherically concave adjacent and at the sides of the slots 12 to conform with the surfaces of the balls 15. This provides spherical seats 17 in the openings 13, as shown in Figure 4, into which the balls 15 nest when the cables C are under tension. The seats 17 have substantial contact with the balls to obtain an effective load distribution. Furthermore, the engagement of the balls 15 with their seats 17 resists lateral displacement of the balls from the openings 13. It will be noted that the block-like end portions of the body sections 10 provide ample stock or material where the balls 15 engage in the body sections.

The body sections 10 further include intermediate portions 18 of reduced width connecting the above described block-like end portions with opposite end portions of U shaped cross-section. These opposite end portions have spaced side walls 19 joined by webs 20 which are, in effect, continuations of the intermediate portions 18. The inner ends of the side walls 19 are sloping as clearly illustrated in Figures 1 and 2. The two body sections 10 are arranged and related so that the block-like end portion of one section is received in the U shaped end portion of the other section. The above mentioned link 11 connects the two sections 10 so that they may be operated between the released or open position of Figure 1 and the engaged or closed position of Figure 2. The link 11 may be a simple elongate part having its end portions received between the side walls 19 of the sections 10. Hinge pins 21 are engaged in transverse openings in the side walls 19 and the end parts of the link 11 to pivotally connect the sections 10 with the link. The opposite ends of the pivot pins 21 may be riveted over or headed up to permanently connect the parts. When the connector is in the open or extended condition shown in Figure 1, its overall length is materially increased. This provides slack in the cable C and allows easy entrance or removal of the balls 15 from their openings 13, as the case may be. Upon moving the body sections 10 together or toward one another the link 11 causes them to move axially in a manner to reduce the overall length of the device. This tightens or tensions the cable C and firmly engages the balls 15 in their seats 17. Furthermore, when the body sections 10 are moved together, each section has its side walls 19 in adjacent overlapping relation to the sides of the block-like end part of the other section 10. Thus the side walls 19 are brought to positions where they close the opposite ends of the openings 13 to positively prevent displacement of the balls 15 from the openings.

The invention provides means for locking or retaining the body sections 10 in the closed position of Figure 2 where the balls 15 are positively held in the openings 13. The parts are constructed and related so that the axes of the pivot pins 21 throw "over center" or beyond the central longitudinal axis of the device to resist opening or extending of the device. The webs 20 are engageable with the surfaces of the block-like end parts to limit the closing of the device and the parts are related so that the pivot pins 21 move a short distance over center before the surfaces come into engagement. Additional means are provided to lock or retain the sections 10 in the closed or service positions of Figure 2. Openings 23 and 24 are provided in the link 11 and side walls 19 respectively. These openings are located to come into register when the sections 10 are brought to the contracted or closed position of Figure 2 and are adapted to receive safety wire or cotter pins 25. It will be seen that the cotter pins 25 positively hold or lock the sections 10 in the contracted positions where the balls 15 are positively retained in the openings 13. However, it is to be understood that the pins 25 normally do not take any of the tensile load transmitted through the connector and the pins are primarily safety devices.

It is believed that the operation of the connector of Figures 1 to 6 inclusive will be readily understood from the foregoing detailed description. To connect the cables C with the body sections 10, the sections 10 are first moved to the extended positions shown in Figure 1 and the fittings 14 are entered into the slots 12 so as to engage the balls 15 in the openings 13. When this has been done the sections 10 are moved together until the axes of the pivot pins 21 have moved past the central longitudinal axis of the device. This tensions the cable C and tightly engages the balls 15 on their seats 17. Further, the side walls 19 are brought to the positions where they positively retain the balls 15 in the openings 13 by closing the opposite ends of the openings. The openings 23 and 24 are brought into alignment when the body sections 10 are moved together and the cotter pins 25 are passed through the aligned openings to lock the device in the closed or service position. To release the cable C the cotter pins 25 are first removed and the body sections 10 are then moved to the positions shown in Figure 1. This slacks off the cable C and exposes the openings 13 and slots 12 so that the fittings 14 and balls 15 may be easily disengaged from the body sections.

Figures 7, 8 and 9 illustrate another form of the invention in which the cable is tensioned when the device is conditioned for service and wherein the cable is slackened when the connector is conditioned to permit disconnection of the cable. This device includes two body sections 30 connected by a link 31, and a clip 32 for retaining the ball fittings in positive engagement with the body sections.

The body sections 30 may be similar or identical parts and each includes an end portion 33 of substantial width provided with a slot 34 and an opening 35 corresponding to the slots 12 and openings 13 described above. The forward walls of the openings 13 are spherically concave to provide seats 36 for the balls 15 of the cable fittings. The fittings 14 and the balls 15 are readily entered into the slots 34 and the openings 35 by moving them laterally into place. In this construction the parts are proportioned so that the balls 15 protrude from the opposite sides of the body portions 33 when seated in the openings 35. This is best illustrated in Figure 9.

Each body section 30 further includes an intermediate portion 36 connecting its end portion 33 with an opposite end portion 37. Ledges 38 extend along the outer margins of the intermediate portions 36 and end portions 37. The inner margins of the body sections are defined in part by cylindrically curved concave surfaces 39. The end portion 37 of one body section 30 has a tongue 40 of reduced thickness projecting toward the opposite end portion 33. The end part 37 of the other section 30 has a similar tongue 42. The tongues 40 and 42 may be related to come into lapped relation where the body sections 30 are brought to the closed or service positions. However, I have shown the tongue 42 split or bifurcated to receive the tongue 40 when the sections 30 are moved to the contracted or service positions. Each portion 37 and its tongue has a cylindrically curved convex surface adapted to nest or seat in the surface 39 of the other body section 30 when the connector is closed or brought to the service condition.

The above mentioned link 31 connects the body sections 30 for actuation or movement between the extended position of Figure 7 and the contracted or service position of Figures 8 and 9. The link 31 preferably consists of two parts or leaves arranged at opposite sides of the body portions 37 and secured thereto by pivot pins 41. As best shown in Figure 9, the pins 41 are engaged in transverse openings in the portions 37 and link 31 and their opposite ends may be upset to permanently pivotally connect the body sections 30 and link 31. The parts are related so that the axes of the pivot pins 41 move over or pass the central longitudinal axis of the device when the sections 30 are moved to the service positions of Figures 8 and 9. The above mentioned ledges 38 may cooperate with the leaves of the link 31 to limit the inward travel of the body sections 30 and stop them in the operative or service positions. The over center position of the pivots 41 effectively resists unintentional movement of the body sections 30 toward the extended positions.

The aforementioned clip 32 cooperates with the balls 15 of the cable fittings to retain them in their openings 35 and to hold or assist in holding the body sections 30 in their service positions. The clip is an elongate member of U shaped cross-section designed to straddle or engage over the body sections 30 and link 31. It is preferred to construct the clip 32 of steel or other flexible resilient material so that it may snap over the balls 15 as will be later described. The clip 32 has two parallel sides 44 integrally joined along their upper edges by a curved web 45. The sides 44 are adapted to lie adjacent to or in engagement with the side faces of the link 31 and ledges 38 and are stepped inwardly at 46 so as to engage along the sides of the end portions 33. The clip is designed to have latching engagement with the protruding portions of the balls 15. Transverse openings 47 are provided in the sides 44 of the clip and are located and proportioned to cooperate with the projecting parts of the balls. When the body sections 30 have been brought to the contracted or service positions, the clip 32 is engaged over the device and is pressed inwardly so that the balls 15 snap into the openings 47, the sides 44 of the clip flexing outwardly and then springing back to provide the snap action. The engagement of the balls 15 in the openings 47 holds the balls against displacement from their openings 45 and locks the clip in position on the device. Furthermore, engagement of the balls 15 in the openings 47 latches or locks the body sections 30 against accidental movement toward the open or extended positions.

If desired, additional means may be provided to retain the clip 32 in position and to prevent accidental disconnection of the device. This means may comprise a series of openings 48 in the clip sides 44, link 31 and tongues 40 and 42, which openings come into alignment when the sections 30 are moved to the contracted or service positions. A cotter pin 49, or the equivalent, is passed through the aligned openings 48 to positively retain the clip 32 in its active locking position. The pin 49 is a safety lock and does not assume the tensile load transmitted by the connector.

In using the device of Figures 7, 8 and 9, the body sections 30 are first moved to the extended positions shown in Figure 7. The balls 15 of the cable fittings are then passed laterally into their openings 35 and the body sections 30 are moved toward one another. It will be observed that when the sections 30 are in their extended positions the cable C is slack so that the balls 15 may be readily entered in the openings 35. When the body sections 30 are moved toward one another the overall length of the connector is reduced and the cable is put under tension. This firmly seats the balls 15 in their seats. The clip 32 is then pressed over the connector so that the balls 15 snap into the openings 47. As above described, this positively locks or retains the balls 15 in the openings 35 and latches the clip 32 on the connector. If desired, or believed necessary, the cotter pin 49 may be arranged through the openings 48 to positively secure the clip in place. When it is desired to disconnect the cable C the clip 32 is disengaged from the connector and the body sections 30 are swung to the extended positions. This provides slack in the cable and permits easy disengagement of the balls 15 from the openings 35.

In Figures 10 to 13 inclusive of the drawings, I have illustrated a simple form of the invention which comprises a body 50 and a clip 51 for retaining the cable fittings in positive tension transmitting engagement with the body.

The body 50 may be a simple block-like part provided with two transverse openings 52 for receiving the balls 15 of the cable fittings. Transverse slots 53 extend from the openings 52 to the adjacent ends of the body 50 to freely receive the fittings 14. The walls of the openings 52 are spherically concave adjacent the slots 53 to present seats 54 of substantial area which conform with the balls. The opposite sides of the body 50 may be flat and parallel and the body is proportioned so that the balls 15 project from these side surfaces.

The above mentioned clip 51 is a member of U shaped cross-section having two spaced side walls 55 connected at their upper edges by a curved bridge or web 56. The clip is formed of steel or the like to have the desired flexibility. It is preferred to construct the clip 51 of approximately the same length as the body 50 and the clip is adapted to be engaged downwardly over the body. Transverse openings 57 are provided in the side walls 55 of the clip to receive the projecting portions of the balls. The openings 57 are located and proportioned so that the balls 15 snap into them when the clip is pressed down over the body.

In using the cable connector of Figures 11, 12 and 13, the balls 15 and the fittings 14 are entered laterally into the openings 52 and slots 53 so that the balls may engage in their seats 54. With the balls 15 in position the clip 51 is engaged on the body 50 and is pressed into place so that the balls 15 snap into the openings 57. The engagement of the openings 57 with the balls positively holds the balls in the openings 52 and at their seats 54 and therefore assures a positive connection of the cable C. When it is desired to disconnect the cable C the clip 51 is disengaged from the body 50. This leaves the ends of the openings 52 open and the balls 15 are easily removed from the openings to free the cable C.

Having described only typical preferred forms of the invention I do not wish to be restricted to the specific details set forth, but wish to reserve to myself any features or modifications that may fall within the scope of the following claims.

I claim:

1. A connector for cables and the like having end fittings with ball-like heads, the connector comprising two body sections, each section having a transverse opening adjacent one end, each opening having at least one end open at a side of its respective section for the reception of a cable fitting head, a link connecting the body sections for movement toward and away from one another to tension and slacken the cables connected therewith, and means associated with the sections for preventing displacement of the heads from the openings when the body sections are in the positions where the cables are tensioned.

2. A connector for cables and the like having end fittings with ball-like heads, the connector comprising two body sections, each section having a transverse opening extending through it from one side to the other and adapted to receive a cable fitting head, each section also having a slot extending from one end to its respective opening for receiving a cable fitting, a link connecting the sections for movement toward and away from one another to tension and slacken the cables connected therewith, and means associated with the sections for retaining said heads in the openings when the sections are in the positions where the cables are tensioned, said means including spaced walls for lying adjacent said sides of the sections at said openings.

3. A connector for cables and the like having end fittings with ball-like heads, the connector comprising two body sections, each section having a transverse opening adjacent one end, each opening having at least one end open at a side of its respective section for the reception of a cable fitting head, a link connecting the body sections for movement toward and away from one another to tension and slacken the cables connected therewith, and a substantially U-shaped part on each section for straddling the other section to close the ends of its opening when the sections are in the positions where the cables are tensioned.

4. A connector for cables and the like having end fittings with ball-like heads, the connector comprising two body sections, each section having a transverse opening adjacent one end, each opening have at least one end open at a side of its respective section for the reception of a cable fitting head, a link connecting the body sections for movement toward and away from one another to tension and slacken the cables connected therewith, at least one wall on each section adapted to lie alongside of said side of the other section to close the end of its respective opening when the sections are in the position where the cables are tensioned, and means for retaining the sections in the positions where the cables are tensioned.

5. A connector for cables and the like having end fittings with ball-like heads, the connector comprising two body sections, each section having a transverse opening adjacent one end, each opening having at least one end open at a side of its respective section for the reception of a cable fitting head, a link connecting the body sections for movement toward and away from one another to tension and slacken the cables connected therewith, and a single member arranged on the sections to prevent displacement of the heads from said openings.

6. A connector for cables and the like having ball end fittings, the connector comprising two body sections, each section having a slot entering it from one end and a transverse opening joining the slot, the slot being adapted to receive a cable fitting and the opening being adapted to receive the ball of the fitting in such a manner that the ball protrudes from the opposite sides of the section, a link connecting the sections for movement toward and away from one another to tension and slacken the cables connected therewith, and a clip adapted to snap over the protruding portions of the balls to retain the balls in said openings.

7. A connector for cables and the like having ball end fittings, the connector comprising two body sections, each section having a slot entering it from one end and a transverse opening joining the slot, the slot being adapted to receive a cable fitting and the opening being adapted to receive the ball of the fitting in such a manner that the ball protrudes from the opposite sides of the section, a link connecting the sections for movement toward and away from one another to tension and slacken the cables connected therewith, and a clip arranged on the sections and having spaced side walls at the sides of the sections, said side walls having openings adapted to have snap engagement with the protruding portions of the balls to retain the balls in the openings.

8. A connector for cables and the like having ball end fittings, the connector comprising two body sections, each section having a slot entering it from one end and a transverse opening joining the slot, the slot being adapted to receive a cable fitting and the opening being adapted to receive the ball of the fitting in such a manner that the ball protrudes from the opposite sides of the section, a link connecting the sections for movement toward and away from one another to tension and slacken the cables connected therewith, and a U-shaped spring clip arranged on the sections and having spaced side walls at the sides of the sections, said side walls having openings adapted to have snap engagement with the protruding portions of the balls to retain the balls in the openings.

9. A connector for cables and the like having end fittings with ball-like heads, the connector comprising two body sections, each section having a transverse opening adjacent one end, each opening having at least one end open at a side of its respective section for the reception of a cable fitting head, a link, pivot pins connecting the link with the body sections so that the link connects the body sections for movement toward and away from one another to tension and slacken the cables connected therewith, walls on each section adapted to lie alongside the sides of the other section to close the ends of its transverse opening when the sections are in the position where the cables are tensioned, the axes of said pivot pins being moved past the central longitudinal axis of the connector when the sections are moved to the position where the cables are tensioned, and means for retaining the sections in the positions where the cables are tensioned.

EDGAR G. PETERS.

REFERENCES CITED

The following references are of record in the file of this patent:

UNITED STATES PATENTS

| Number | Name | Date |
|---|---|---|
| 946,594 | Brock | Jan. 18, 1910 |
| 1,410,908 | Garman | Mar. 28, 1922 |
| 1,680,706 | Tost | Aug. 14, 1928 |
| 2,305,234 | Bratz | Dec. 15, 1942 |